(12) United States Patent
Sakamoto

(10) Patent No.: US 7,767,312 B2
(45) Date of Patent: Aug. 3, 2010

(54) LAYERED PRODUCT

(75) Inventor: Shinji Sakamoto, Kanagawa (JP)

(73) Assignee: Japan Polyethylene Corporation, Tokyo (JP)

( * ) Notice: Subject to any disclaimer, the term of this patent is extended or adjusted under 35 U.S.C. 154(b) by 527 days.

(21) Appl. No.: 11/573,791

(22) PCT Filed: Aug. 15, 2005

(86) PCT No.: PCT/JP2005/014897

§ 371 (c)(1),
(2), (4) Date: Feb. 16, 2007

(87) PCT Pub. No.: WO2006/019066

PCT Pub. Date: Feb. 23, 2006

(65) Prior Publication Data

US 2008/0051518 A1    Feb. 28, 2008

(30) Foreign Application Priority Data

Aug. 17, 2004   (JP)   ................ P. 2004-237365

(51) Int. Cl.
*B32B 27/08*    (2006.01)
*B32B 27/00*    (2006.01)
*B32B 27/36*    (2006.01)
*B32B 29/00*    (2006.01)

(52) U.S. Cl. ............... 428/500; 428/475.5; 428/475.8; 428/461; 428/483; 428/515; 428/537.5

(58) Field of Classification Search ............... None
See application file for complete search history.

(56) References Cited

U.S. PATENT DOCUMENTS 6,333,096 B1 *  12/2001  Rodgers et al. ............. 428/213

FOREIGN PATENT DOCUMENTS

| JP | 2-185547 | 7/1990 |
|---|---|---|
| JP | 7-329262 | 12/1995 |
| JP | 11-293054 | 10/1999 |
| JP | 2000-512571 | 9/2000 |
| JP | 2004-250464 | 9/2004 |
| WO | WO 01/45938 A1 | 6/2001 |
| WO | WO 02/098658 A1 | 12/2002 |
| WO | WO 03/029000 A1 | 4/2003 |

* cited by examiner

*Primary Examiner*—Sheeba Ahmed
(74) *Attorney, Agent, or Firm*—Oblon, Spivak, McClelland, Maier & Neustadt, L.L.P.

(57) ABSTRACT

An easy-to-tear laminate is provided which is satisfactory in tearability and heat-sealing strength and excellent in ease of opening and contents-protecting performance. The laminate comprises a base layer and a layer comprising 10-95% by weight specific ethylene-based terpolymer (A) and 5-90% by weight specific low-density polyethylene (B) produced by the high-pressure radical polymerization method.

10 Claims, No Drawings

LAYERED PRODUCT

BACKGROUND OF THE INVENTION

1. Field of the Invention

The present invention relates to a laminate. More particularly, the invention relates to a laminate having a layer made of a polyethylene composition and having an excellent balance among tearability, punchability, heat-sealing strength low-temperature heat sealability, and hot-tack properties.

2. Description of Related Art

There is a trend toward volume reduction in packages/containers for beverages and foods, seasonings, medicines, etc because of the recent problem concerning final refuse disposal, the Recycling Law, and the like. On the other hand, investigations are being made on use of containers made of paper as containers which are easy to burn and have a low calorific value of combustion in incineration. From the standpoint of convenience for use, these packages/containers are desired to be easy to open.

Laminates which have been used as the materials of conventional packages/containers are ones obtained by laminating a polyethylene resin comprising high-pressure-process low-density polyethylene (LDPE), an ethylene/vinyl acetate copolymer (EVA), or the like as a heat-sealable layer resin to a base such as paper or a biaxially oriented polyamide, polyester, polypropylene, or the like, from the standpoint of imparting properties required of containers having heat sealability moisture-proof properties etc.

Recently, however, use of linear low-density polyethylene (LLDPE), in particular, LLDPE produced by polymerization with a metallocene catalyst, has come to be proposed in order to improve the heat-sealing strength, low-temperature heat sealability, hot-tack properties, impact resistance, pinhole-free properties, etc. of those laminates.

The LLDPE produced by polymerization with a metallocene catalyst is characterized by being heat-sealable at low temperatures and having high sealing strength and high hot-tack strength, and is in extensive use as a sealant in light packages, paper containers for liquids, etc. However, in applications involving a punching step, such as paper cups and paper containers, the polyethylene has problems, for example, that it shows poor punchability and cannot be punched and the resin layer stretches disadvantageously, resulting in a poor appearance. When used in binding paper or easy-to-tear packages, the polyethylene has problems, for example, that since it has poor tearability, opening necessitates power and the resin layer stretches.

Many attempts have been made to overcome those problems. For example, a laminate of LLDPE produced by polymerization with a metallocene catalyst and LLDPE produced by polymerization with a Ziegler catalyst has been proposed (see, for example, patent document 1) This laminate has slightly improved tearability due to the LLDPE produced by polymerization with a Ziegler catalyst. However, the elongation attributable to the LLDPE produced by polymerization with a metallocene catalyst still remains uneliminated and, in particular, heat sealability is considerably sacrificed. Consequently, that technique is not a desirable one. On the other hand, a technique has been proposed in which a cycloolefin polymer which is an amorphous resin is added to LLDPE produced by polymerization with a metallocene catalyst (see, for example, patent document 2). However, this technique has a problem concerning a decrease in transparency which occurs upon heating. Furthermore, an invention has been disclosed in which LDPE having a specific swelling ratio is incorporated into LLDPE produced by polymerization with a metallocene catalyst (see, for example, patent document 3). However, this technique has been insufficient in balance between heat-sealing strength and tearability.

Patent Document 1: JP-A-10-24539
Patent Document 2: JP-A-2000-129005
Patent Document 3: JP-A-2000-212339

DISCLOSURE OF THE INVENTION

In view of the problems described above, an object of the invention is to provide a laminate which is satisfactory in tearability, punchability, low-temperature heat sealability, heat-sealing strength, and hot-tack properties and is excellent in ease of opening, punchability, and contents-protecting performance.

SUMMARY OF THE INVENTION

The present inventors made intensive investigations in order to overcome the problems described above. As a result, they have found that a laminate comprising a layer of a polyethylene composition comprising a specific ethylene-based terpolymer and a specific low-density polyethylene (referred to also as a polyethylene composition layer) and a base layer can be a laminate which is satisfactory in tearability, punchability, heat sealability, heat-sealing strength, and hot-tack properties and is excellent in ease of opening, punchability, and contents-protecting performance. The invention has been thus completed, which has the constitutions shown below.

(1) A laminate which comprises
   a base layer and
   a layer comprising (A) 10-95% by weight ethylene-based terpolymer of ethylene, propylene, and either 1-hexene or 1-octene, which has the following properties (a-1) to (a-4) and (B) 5-90% by weight low-density polyethylene obtained by the high-pressure radical polymerization method, which has the following properties (b-1) to (b-3):
      (a-1) a melt flow rate is 0.1-100 g/10 min;
      (a-2) a density is 0.87-0.92 g/cm$^3$;
      (a-3) an ethylene content is 80-99% by mole;
      (a-4) a ratio of the molar proportion of propylene (Mp) to the molar proportion of 1-hexene or 1-octene (Mh), Mp/Mh, is 1.5 or higher;
      (b-1) a melt flow rate is 0.1-20 g/10 min;
      (b-2) a density is 0.915-0.93 g/cm$^3$; and
      (b-3) a memory effect is 1.6 or higher.

(2) The laminate as described under (1) above wherein the low-density polyethylene (B) is long-chain branched low-density polyethylene.

(3) The laminate as described under (1) or (2) above, wherein the ethylene-based terpolymer (A) is produced with a metallocene catalyst.

(4) The laminate as described under any one of (1) to (3) above wherein the ethylene-based terpolymer (A) further has the following property (a-5);
      (a-5) a density (d) (g/cm$^3$) and a melting point (Tm) (° C.) satisfy expression (1):

$$1220 \times d - 1019 \leq Tm \leq 1220 \times d - 1005 \quad (1)$$

(wherein the melting point (Tm) is a melting point as measured during second scanning with a DSC, the melting point corresponding to the maximum peak height).

(5) The laminate as described under any one of (1) to (4) above, wherein the layer comprising the ethylene-based terpolymer (A) and the low-density polyethylene (B) is a layer formed by the extrusion coating method.

(6) The laminate as described under any one of (1) to (5) above which is an easy-to-tear laminate.

DETAILED DESCRIPTION OF THE INVENTION

The laminate of the invention is a laminate satisfactory in tearability, punchability, heat-sealing strength, low-temperature heat sealability, and hot-tack properties and excellent in ease of opening, punchability, and contents-protecting performance, because it comprising a polyethylene composition layer comprising a specific ethylene-based terpolymer and a specific low-density polyethylene and a base layer.

BEST MODE FOR CARRYING OUT THE INVENTION

The invention is a laminate comprising: a polyethylene composition layer comprising an ethylene-based terpolymer (A) which has the following properties (a-1) to (a-4) and optionally further has the property (a-5) and a low-density polyethylene (B) obtained by the high-pressure radical polymerization method which has the following properties (b-1) to (b-3); and a base layer. The invention will be explained below in detail with respect to each item.

1. Polyethylene Composition Layer (1) Polyethylene-Based Terpolymer (A)

The ethylene-based terpolymer (A) to be used in the polyethylene composition layer in the invention is a terpolymer of ethylene, propylene, and either 1-hexene or 1-octene and has the following properties (a-1) to (a-4). It further has the following property (a-5) according to need.

(a-1) MFR

The melt flow rate (MFR: 190° C., 21.18-N load) of the ethylene-based terpolymer to be used in the invention is 0.1-100 g/10 min, preferably 1-60 g/10 min, more preferably 5-50 g/10 min. MFR's lower than 0.1 g/10 min are undesirable because the polyethylene composition has poor spreadability during molding and an increased load is imposed on the motor in the extruder. On the other hand, MFR's exceeding 100 g/10 min are undesirable because the melt film during molding is in an unstable state. For regulating the MFR of the ethylene-based terpolymer, use may be made of a method in which the polymerization temperature, catalyst amount, feed amount of hydrogen as a molecular weight regulator, etc. are suitably regulated.

The values of MFR herein are ones measured in accordance with JIS-K7210 (190° C., 21.18-N load).

(a-2) Density

The density of the ethylene-based terpolymer to be used in the invention is 0.87-0.92 g/cm$^3$, preferably 0.88-0.915 g/cm$^3$, more preferably 0.89-0.91 g/cm$^3$. Densities lower than 0.870 g/cm$^3$ are undesirable because the polyethylene composition layer has poor unsusceptibility to blocking. On the other hand, densities exceeding 0.92 g/cm$^3$ are undesirable because the polyethylene composition layer has poor low-temperature heat sealability.

The values of density herein are ones determined in accordance with JIS K7112.

(a-3) Ethylene Content

The ethylene-based terpolymer to be used in the invention is one obtained by copolymerizing ethylene as the main ingredient with propylene and either 1-hexene or 1-octene The ethylene content in the terpolymer is 80-99% by mole, preferably 83-98% by mole, more preferably 85-97% by mole. Ethylene contents lower than 80% by mole are undesirable because the polyethylene composition layer has poor unsusceptibility to blocking. Ethylene contents exceeding 99% by mole are undesirable because the polyethylene composition layer has poor low-temperature heat sealability.

The values of ethylene content herein are ones determined by $^{13}$C-NMR spectroscopy (a-4) Molar Ratio of Propylene to 1-Hexene or 1-Octene In the ethylene-based terpolymer to be used in the invention, the ratio of the molar proportion of propylene (Mp) to the molar proportion of 1-hexene or 1-octene (Mh), Mp/Mh, is 1.5 or higher, preferably 1.8-6.5, more preferably 2.0-5.5. Mp/Mh ratios lower than 1.5 are undesirable because the polyethylene composition layer has poor tearability, resulting In impaired suitability for opening.

The values of the molar proportion of propylene (Mp) and the molar proportion of 1-hexene or 1-octene (Mh) herein are ones determined by the $^{13}$C-NMR spectroscopy described in *Macromolecules*, (1982) 15, pp. 1150-1152 under the following conditions.

Apparatus: Unity Plus 400, manufactured by Varian Inc.
Solvent: o-dichlorobenzene (75)/benzene-d6 (25)
Examination concentration: 15 (wt/v)%
Examination temperature: 120° C.
Pulse sequence: 1H complete decoupling method
Pulse angle: 90°
Pulse duration: 20 seconds (a-5) Relationship Between Density (d) and Melting Point (Tm)

The density (d) (g/cm$^3$) and melting point (Tm) (° C.) of the ethylene-based terpolymer to be used in the invention preferably satisfy expression (1)

$$1220 \times d - 1019 \leq Tm \leq 1220 \times d - 1005 \quad (1)$$

(In expression (1), the melting point (Tm) is a melting point as measured during second scanning with a DSC in accordance with JIS K7121, the melting point corresponding to the maximum peak height.)

They more preferably satisfy expression (1').

$$1220 \times d - 1017 \leq Tm \leq 1220 \times d - 1007 \quad (1')$$

(In expression (1') the melting point (Tm) is a melting point as measured during second scanning with a DSC, the melting point corresponding to the maximum peak height.)

Incidentally, expressions (1) and (1') are expressions derived from the results of many experiments and are indexes to the width of crystalline distribution. When the ethylene-based terpolymer satisfies either of those expressions, this means that the terpolymer has a narrow crystalline distribution. In case where Tm is outside the upper limits the polyethylene composition layer has poor tearability. In case where Tm is outside the lower limit, the polyethylene composition layer has poor low-temperature hot-tack properties.

Processes for producing the ethylene-based terpolymer to be used in the invention are not particularly limited with respect to the catalyst and polymerization method to be used, as long as a copolymer having the properties (a-1) to (a-4) described above and optionally further having the property (a-5) can be produced. However, examples of catalysts suitable for producing a polymer such as the terpolymer described above include metallocene catalysts.

Specific examples of the metallocene catalysts include the catalysts comprising a metallocene compound and a cocatalyst and optionally further including an organoaluminum compound which are described in, e.g., JP-A-58-19309, JP-A-59-95292, JP-A-60-35006, JP-A-60-35007, JP-A-60-35008, JP-A-61-130314, JP-A-3-163088, European Patent Application Publication No. 420,436, U.S. Pat. No. 5,055,438, International Publication WO 91/04257, and International Publication WO 92/07123.

Examples of the metallocene compound include bis(cyclopentadienyl)zirconium dichloride,
bis(indenyl)zirconium dichloride, bis(fluorenyl)zirconium dichloride, bis(azulenyl)zirconium dichloride,
bis(4,5,6,7-tetrahydroindenyl)zirconium dichloride, (cyclopentadienyl)(3,4-dimethylcyclopentadienyl)zirconium dichloride, methylenebis(cyclopentadienyl)zirconium dichloride,
methylene(cyclopentadienyl)(3,4-dimethylcyclopentadienyl)zirconium dichloride,
isopropylidene((cyclopentadienyl)(3,4-dimethylcyclopentadienyl)zirconium dichloride,
ethylene(cyclopentadienyl)(3,5-dimethylpentadienyl)zirconium dichloride, methylenebis (indenyl)zirconium dichloride,
ethylenebis(4,5,6,7-tetrahydroindenyl)zirconium dichloride, ethylenebis(2-methylindenyl)zirconium dichloride,
ethylene-1,2-bis(4-phenylindenyl)zirconium dichloride,
ethylene(cyclopentadienyl)(fluorenyl)zirconium dichloride,
dimethylsilylene(cyclopentadienyl)(tetramethylcyclopentadienyl)zirconium dichloride,
dimethylsilylenebis(indenyl)zirconium dichloride,
dimethylsilylenebis(4,5,6,7-tetrahydroindenyl) zirconium dichloride,
dimethylsilylene(cyclopentadienyl))(fluorenyl)zirconium dichloride,
dimethylsilylene(cyclopentadienyl)(octahydrofluorenyl)zirconium dichloride,
methylphenyisilylenebis[1-(2-methyl-4,5-benzo(indenyl)) zirconium dichloride,
dimethylsilylenebis[1-(2-methyl-4,5-benzoindenyl)]zirconium dichloride,
dimethylsilylenebis[1-(2-methyl-4H-azulenyl)]zirconium dichloride,
dimethylsilylenebis[1-(2-methyl-4-(4-chlorophenyl)-4H-azulenyl)]zirconium dichloride,
dimethylsilylenebis[1-(2-ethyl-4-(4-chlorophenyl)-4H-azulenyl)]zirconium dichloride,
dimethylsilylenebis[1-(2-ethyl-4-naphthyl-4H-azulenyl)] zirconium dichloride
diphenylsilylenebis[1-(2-methyl-4-(4-chlorophenyl)-4H-azulenyl)]zirconium dichloride,
dimethylsilylenebis[1-(2-methyl-4-(phenylindenyl)]zirconium dichloride,
dimethylsilylenebis[1-(2-ethyl-4-(phenylindenyl))]zirconium dichloride,
dimethylsilylenebis[1-(2-ethyl-4-naphthyl-4H-azulenyl)] zirconium dichloride, dimethylgermylenebis(indenyl)zirconium dichloride, and
dimethylgermylene(cyclopentadienyl)(fluorenyl)zirconium dichloride.

The cocatalyst to be used in combination with the metallocene compound means a substance which enables the metallocene compound to effectively function as a polymerization catalyst or which can balance ionic charges in a catalytically activated state. Examples of the cocatalyst to be used in the invention include organoaluminumoxy compounds such as benzene-soluble aluminoxanes and benzene-insoluble organoaluminumoxy compounds, ion-exchange phyllosilicates, boron compounds, lanthanoid salts such as lanthanum oxide, and tin oxide.

The metallocene compound may be used after having been deposited on a support comprising an inorganic or organic compound. The support preferably is a porous oxide of an inorganic or organic compound. Examples thereof include ion-exchange phyllosilicates, $SiO_2$, $Al_2O_3$, MgO, $ZrO_2$, $TiO_2$, $B_2O_3$, CaO, ZnO, BaO, $ThO_2$, and mixtures thereof.

Examples of the organoaluminum compound which may be used according to need include trialkylaluminums such as triethylaluminum, triisopropylaluminum, and triisobutylaluminum; dialkylaluminum halides; alkylaluminum sesquihalides; alkylaluminum dihalides; alkyl aluminum halides; and organoaluminum alkoxides.

Examples of polymerization methods for producing the terpolymer of ethylene, propylene, and 1-hexene or 1-octene using the catalyst described above include the vapor-phase polymerization method, solution polymerization method, and high-pressure polymerization method.

In the vapor-phase polymerization method, it is preferred to conduct polymerization at a reaction temperature of about 50-100° C. and a reaction pressure of about 10-40 kgf/cm².

In the solution polymerization method, it is preferred to conduct polymerization at a reaction temperature of about 100-300° C. and a reaction pressure of about 10-60 kgf/cm² using cyclohexane as a solvent.

In the high-pressure polymerization method, it is preferred to conduct polymerization at a reaction temperature of about 150-300° C. and a reaction pressure of about 200-1,500 kgf/cm².

(2) Low-Density Polyethylene (B) by High-Pressure Radical Polymerization Method

The low-density polyethylene (B) to be used in the polyethylene composition layer in the invention is a low-density polyethylene (preferably, long-chain branched low-density polyethylene) which has been produced by the high-pressure radical polymerization method and has the following properties (b-1) to (b-3).

(b1) MFR

The melt flow rate (MFR) of the low-density polyethylene to be used in the invention is 0.1-20 g/10 min, preferably 1-15 g/10 mine more preferably 2-15 g/10 min. In case where the MFR thereof is lower than 0.1 g/10 min, the polyethylene composition has insufficient spreadability and suffers film breakage during high-speed molding. On the other hand, in case where the MFR thereof exceeds 20 g/10 min, the melt film becomes unstable.

The values of MFR herein are ones measured in accordance with JIS-K7210 (190° C., 21.18-N load).

(b-2) Density

The density of the low-density polyethylene to be used in the invention is 0.915-0.93 g/cm³, preferably 0.916-0.926 g/cm³, more preferably 0.917-0.925 g/cm³. In case where the density thereof is lower than 0.915 g/cm³, the polyethylene composition layer has enhanced tackiness. On the other hand, densities thereof exceeding 0.93 g/cm³ result in poor low-temperature heat sealability.

The values of density herein are ones determined in accordance with JIS K7112.

(b-3) Memory Effect (ME)

The memory effect (ME) of the low-density polyethylene to be used in the invention is 1.6 or higher, preferably 1.8-3, more preferably 1.9-2.6. In case where the memory effect thereof is lower than 1.6, the melt film is unstable.

The values of ME are determined through a measurement made with a melt indexer used in JIS K7210under the set conditions of a cylinder temperature of 240° C. and a constant extrusion rate of 3 g/min in the following manner. A sample is charged into the device, and the piston only is put thereon. At 6 minutes thereafter, a given load is imposed. Subsequently, a measuring cylinder filled with ethyl alcohol is placed directly under the orifice to obtain a straight extrudate. The diameter (D) of the extrudate obtained is measured with a micrometer. When the orifice diameter of the die is expressed as D0, ME is determined using the following equation.

$$ME=D/D0$$

The low-density polyethylene to be used in the invention is produced generally by polymerizing ethylene using a tank type reactor or a tubular reactor in the presence of a radical generator under the conditions of a polymerization pressure of 1,400-3,000 kg/cm$^2$ and a polymerization temperature of 200-300° C. The melt flow rate thereof can be regulated by using hydrogen or a hydrocarbon, such as methane or ethane, as a molecular weight regulator.

(3) Proportions of Ingredient (A) and Ingredient (B)

In the polyethylene composition layer to be used in the invention, the proportion of the ethylene-based terpolymer (A) to the low-density polyethylene (B) produced by the high-pressure radical polymerization method is (10-95% by weight):(5-90% by weight), preferably (20-90% by weight):(10-80% by weight), more preferably (30-85% by weight):(15-70% by weight). In case where the proportion of the ethylene-based terpolymer is too large, the melt film has poor stability. In case where the proportion of the low-density polyethylene produced by the high-pressure radical polymerization method is too large, the polyethylene composition layer has reduced heat-sealing strength.

(4) Other Compounding Ingredients

Additives in common use in polyethylene resins, such as antioxidants, e.g., phenolic compounds and phosphorus compounds, stabilizers, e.g., metal soaps, antiblocking agents, lubricants, dispersants, pigments, e.g., organic or an organic colorants, antifogging agents, e.g., unsaturated fatty acid esters, antistatic agents, ultraviolet absorbers, light stabilizers, and nucleating agents, may be incorporated according to need into the polyethylene composition layer to be used in the invention.

Furthermore, other thermoplastic resins such as polyethylene resins, e.g., LDPE, C4-LLDPE, HAO-LLDPE, ethylene, vinyl acetate copolymers (EVA), ethylene/acrylic acid copolymers (EAA), ethylene/methacrylic acid copolymers (EMAA), ethylene/acrylic ester copolymers (EEA, EMA, EMMA, etc.), and high-density polyethylene (HDPE), adhesive resins, e.g., ethylene/maleic anhydride copolymers, polypropylene resins, and polystyrene resins may be incorporated as long as this incorporation does not impair the properties of the polyethylene composition layer.

2. Base Layer

Examples of the base layer to be used in the invention include single-layer films of a nylon, polyester, polyropylene, polyethylene, ethylene/vinyl alcohol copolymer, or the like or multilayer films made of the same or different materials selected from these. These films preferably are stretched films. Examples of the base layer further include single-layer bases or multilayer bases such as papers, e.g., kraft paper, foils of a metal, e.g., aluminum or copper, and plastic films coated with a metal or an inorganic or organic substance by vapor deposition.

3. Laminate

The laminate of the invention is a laminate comprising a base layer and a polyethylene composition layer formed on at least one side thereof.

Processes for producing the laminate are not particularly limited. However, the so-called extrusion coating method is preferably in which the polyethylene composition is melt-extruded and superposed on a base layer. In the extrusion coating, it is preferred to superpose one or more layers by a method such as single-layer extrusion, sandwich laminating, coextrusion laminating, or tandem laminating. The polyethylene composition layer can be used not only as a surface-layer sealant but also as an adhesive layer. According to the invention, a melt film is stably extruded and, hence, high-speed molding is possible.

Methods for securing adhesion to the base layer are not particularly limited. For example, it is preferred to subject a surface of the base to a surface treatment or an anchor coating treatment. Examples of techniques for the surface treatment include various treatment techniques such as corona discharge treatment, ozone treatment, flame treatment, and low-temperature plasma treatment. Examples thereof further include a method in which ozone is blown against the molten resin.

The laminate of the invention is formed using the ethylene-based terpolymer described above. It is a laminate satisfactory in tearability, punchability, heat-sealing strength, low-temperature heat sealability, and hot-tack properties and excellent in ease of opening and contents-protecting performance.

Since the laminate of the invention is excellent in tearability, punchability, heat-sealing strength, low-temperature heat sealability, and hot-tack properties, it can be used as a film for easy-to-tear package bags, film for food packaging, paper container for liquids binding paper, paper cups, paper trays, etc.

EXAMPLES

The invention will be explained below by reference to Examples, but the invention should not be construed as being limited to these Examples. The measuring or determination methods and resins used in the Examples and Comparative Examples are as follows.

1. Measuring or Determination Methods (1) MFR: Measurement was made in accordance with JIS K7210 (190° C., 21.18-N load) (unit: g/10 min).

(2) Density: Pellets were hot-pressed to produce a pressed sheet having a thickness of 2 mm. This sheet was placed in a beaker having a capacity of 1,000 mL, which was filled with distilled water. This beaker was covered with a watch glass and heated with a mantle heater. After the distilled water had begun to boil, the water was boiled for 60 minutes. Thereafter, the beaker was placed on a wooden table and allowed to cool. In this operation, the amount of the boiling water which had been boiled for 60 minutes was adjusted to 500 mL and the time period required for the water to cool to room temperature was regulated so as to be longer than 60 minutes. Furthermore, the test sheet was immersed in a nearly central part of the water so as to prevent it from coming into contact with the beaker or the water surface. The sheet was annealed for a period from 16 hours to 24 hours under the conditions of 23° C. and a humidity of 50%, subsequently punched into 2×2 mm squares, and examined in accordance with JIS K7112 at a test temperature of 23° C. (unit: g/cm$^3$).

(3) Ratio of Molar Proportion of Propylene (Mp) to Molar Proportion of Hexene (Mh), i.e., Mp/Mh Ratio: Mp and Mh were determined under the following conditions and the ratio was determined by calculation therefrom.

Apparatus: Unity Plus 400, manufactured by Varian Inc.
    Solvent: o-dichlorobenzene (75)/benzene-d6 (25)
    Examination concentration 15 (wt/v)%
    Examination temperature: 120° C.
    Pulse sequence: 1H complete decoupling method
    Pulse angle: 90°
    Pulse duration 20 seconds (4) Melting Point (in accordance with JIS K7121): Pellets were formed into a sheet by hot pressing, and a sample was punched out of the sheet. A measurement was made under the following conditions; first heating, cooling, and second heating were performed in this order The temperature corresponding to the maximum peak height in the second heating was taken as the melting point (unit: ° C.).

Apparatus: DSC RDC220, manufactured by Seiko Instruments Inc.
    Heating/cooling conditions:
    First heating: 100° C./min from 50° C. to 170° C.
    Cooling: 10° C./min from 170° C. to −10° C.
    Second heating: 10° C./min from −10° C. to 170° C.
    Temperature-maintaining period: 5 minutes after first heating; 1 minute after cooling
    Sample amount: 5 mg
    Reference: aluminum (5) Memory Effect: A melt indexer manufactured by Technol Seven Co., Ltd. was used to determine the memory effect by the method described hereinabove (unit: −).

(6) Trouser-Shaped Tear Strength: Measurement was made in the direction (TD) perpendicular to the film haul-off direction at a haul-off rate of 200 mm/min in accordance with JIS-K7128-1 to determine the tear load. As a sample was used the laminate described in Examples obtained by laminating a 50 μm-thick film to a PET base.

(7) Elmendorf Tear Strength: Measurement was made in the direction (TD) perpendicular to the film haul-off direction in accordance with JIS-K7128-2. The Elmendorf tear load was divided by the thickness. As a sample was used the laminate described in Examples obtained by laminating a 50 μm-thick film to a PET base.

(8) Heat-Sealing Strength: Heat sealing was conducted with a hot plate type heat sealer manufactured by Toyo Seiki, under the conditions of sealing temperatures of 120° C. and 140° C., sealing pressure of 2 kg/cm$^2$, and sealing period of 1 second. Thereafter, strips having a width of 15 mm were produced and examined for heat-sealing strength with a tensile tester. As a sample was used the laminate described in Examples obtained by laminating a 20 μm-thick film to a PET base.

(9) Melt Film Stability: The stability of a melt film was visually examined with a 40-mmΦ extruder and a T-die having a width of 360 mm under the conditions of a lip width of 0.8 mm, air gap of 100 mm, molding temperature of 290° C., and haul-off rate of 20 m/min.

A: Melt film was stable and sampling was possible.
    B: Melt film was unstable and sampling was impossible

(10) Trouser-Shaped Tear Strength 2: Measurement was made in the direction (TD) perpendicular to the film haul-off direction at a haul-off rate of 200 mm/min in accordance with JIS-K7128-1 to determine the maximum tear load. As a sample was used the laminate described in Example 7, which was obtained by laminating a 20 μm-thick film to a kraft base.

EXAMPLES

2. Resin Materials (PE-1) to (PE-7) obtained in the following Production Examples 1 to 7 were used as ethylene-based copolymers of ingredient (A). Property values thereof are shown in Table 1.

Production Example 1

Methyl aluminoxane manufactured by Toyo Stauffer was added to 2.0 mmol of ethylenebis(4,5,6,7-tetrahydroindenyl) zirconium dichloride, which is a complex, in an amount 1,000 times by mole the amount of the complex. This mixture was diluted with toluene to adjust the volume to 10 L. Thus, a catalyst solution was prepared. This catalyst solution was introduced into a stirring autoclave type continuous reactor having a capacity of 1.5 L. A mixture of ethylene, propylene, and 1-hexene was further fed to this reactor so that ethylene/propylene/1-hexene=70/21/9 (% by weight), and reacted at 220° C. while keeping the pressure in the reactor at 800 kg/cm$^2$. After completion o the reaction, an ethylene/propylene/1-hexene terpolymer (PE-1) was obtained which had an MFR of 30 g/10 min, density of 0.907 g/cm$^3$, Mw/Mn of 2.1, molar propylene proportion of 5.3% by mole, molar 1-hexene proportion of 1.9% by mole, and ratio of the molar propylene proportion (Mp) to the molar 1-hexene proportion (Mh), Mp/Mh, of 2.8.

Production Examples 2, 3, 5, and 6

Polymerization was conducted under the same conditions as in Production Example 1, except that the ethylene/propylene/1-hexene feed ratio was changed and the reaction temperature and reaction pressure were regulated. Thus, ethylene/propylene/1-hexene terpolymers (PE-2), (PE-3), (PE-5), and (PE-6) were obtained.

Production Example 4

Polymerization was conducted under the same conditions as in Production Example 1, except that propylene was not fed and the ethylene/1-hexene feed ratio was changed and that the reaction temperature and reaction pressure were regulated Thus, an ethylene/1-hexene copolymer (PE-4) was obtained.

Production Example 7

Polymerization was conducted under the same conditions as in Production Example 1, except that butene was used in place of the propylene and the reaction temperature and reaction pressure were regulated. Thus, an ethylene/butene/1-hexene copolymer (PE-7) was obtained.

TABLE 1

| | Kind of copolymer | MFR g/10 min | Density g/cm³ | Ethylene content mol % | Mp/Mh — | Tm °C. | Molar propylene proportion mol % | Molar 1-hexene proportion mol % | Expression (1)* is satisfied or not | Catalyst |
|---|---|---|---|---|---|---|---|---|---|---|
| PE-1 | ethylene/propylene/1-hexene copolymer | 30 | 0.907 | 92.9 | 2.8 | 94 | 5.3 | 1.9 | satisfied | metallocene |
| PE-2 | ethylene/propylene/1-hexene copolymer | 4 | 0.902 | 92.1 | 2.6 | 90 | 5.7 | 2.2 | satisfied | metallocene |
| PE-3 | ethylene/propylene/1-hexene copolymer | 15 | 0.898 | 92.8 | 0.5 | 86 | 2.3 | 4.9 | satisfied | metallocene |
| PE-4 | ethylene/1-hexene copolymer | 30 | 0.907 | 95.3 | 0 | 97 | 0 | 4.7 | satisfied | metallocene |
| PE-5 | ethylene/propylene/1-hexene copolymer | 45 | 0.887 | 87.3 | 3.6 | 68 | 9.9 | 2.8 | satisfied | metallocene |
| PE-6 | ethylene/propylene/1-hexene copolymer | 11 | 0.902 | 92.3 | 1.8 | 88 | 5.0 | 2.7 | satisfied | metallocene |
| PE-7 | ethylene/butene/1-hexene copolymer | 28 | 0.905 | 93.9 | 1.5 (butene/hexene) | 94 | 3.7 (molar butene proportion) | 2.4 | satisfied | metallocene |

| Low-density polyethylene | MFR g/10 min | Density g/cm³ | ME |
|---|---|---|---|
| LDPE-1 | 4 | 0.918 | 2.4 |
| LDPE-2 | 8 | 0.918 | 2.2 |
| LDPE-3 | 4 | 0.930 | 1.5 |

Example 1

A polyethylene composition composed of 80% by weight PE-1 as an ethylene-based terpolymer and 20% by weight long-chain branched low-density polyethylene produced by the high-pressure radical polymerization method having an MFR of 4 g/10 min, density of 0.918 g/cm³, and ME of 2.4 (LDPE-1) was granulated with a 40-mm single-screw extruder. Thus, pellets of the polyethylene composition were obtained.

Using a 40 mmΦ single-screw extruder, the pellets obtained were extruded through a die having a width of 360 mm at a molding temperature of 290° C. So as to result in a film thickness of each of 50 μm and 20 μm onto a 12 μm-thick PET (Diafoil 12 μm, manufactured by Mitsubishi Polyester Film Corp.) coated beforehand with an anchor coating material (T-180 (manufactured by Nippon Soda):methanol=1:9). Thus, laminates were obtained. The molten resin was treated with ozone. The results of evaluation of the laminates are shown in Table 2.

Example 2

Molding and evaluation were conducted in the same manner as in Example 1, except that long-chain branched low-density polyethylene produced by the high-pressure radical polymerization method having an MFR of 8 g/10 min, density of 0.918 g/cm³, and ME of 2.2 (LDPE-2) was used in Example 1 as a low-density polyethylene in an amount of 40% by weight. The evaluation results are shown in Table 2.

Example 3

Molding and evaluation were conducted in the same manner as in Example 1, except that LDPE-2 was used in Example 2 in an amount of 60% by weight. The evaluation results are shown in Table 2.

Example 4

Molding and evaluation were conducted in the same manner as in Example 1, except that PE-2 was used in Example 3 as an ethylene-based terpolymer. The evaluation results are shown in Table 2.

Example 5

Molding and evaluation were conducted in the same manner as in Example 1, except that PE-5 and LDPE-2 were used in Example 1 as an ethylene-based terpolymer and a long-chain branched low-density polyethylene produced by the high-pressure radical polymerization method, respectively. The evaluation results are shown in Table 2.

Example 6

Molding and evaluation were conducted in the same manner as in Example 1, except that PE-6 was used in Example 4 as an ethylene-base terpolymer. The evaluation results are shown in Table 2.

Comparative Example 1

Molding and evaluation were conducted in the same manner as in Example 1, except that the ethylene-based terpolymer was not used in Example 2. The evaluation results are shown in Table 2.

Comparative Example 2

Molding and evaluation were conducted in the same manner as in Example 1, except that the LDPE was not used in Example 1. The evaluation results are shown in Table 2.

Comparative Example 3

Molding and evaluation were conducted in the same manner as in Example 1, except that PE-3 was used in Example 1 as an ethylene-based terpolymer. The evaluation results are shown in Table 2.

Comparative Example 4

Molding and evaluation were conducted in the same manner as in Example 1, except that PE-4 (ethylene/1-hexene bipolymer) was used in Example 1 in place or the PE-1. The evaluation results are shown in Table 2.

Comparative Example 5

Molding and evaluation were conducted in the same manner as in Example 2, except that PE-4 (ethylene/1-hexene bipolymer) was used in Example 2 in place of the PE-1. The evaluation results are shown in Table 2.

Comparative Example 6

Molding and evaluation were conducted in the same manner as in Example 1, except that LDPE-3 was used in Example 1 in place of the LDPE-1. The evaluation results are shown in Table 2.

Comparative Example 7

Molding and evaluation were conducted in the same manner as in Example 1, except that PE-7 and LDPE-2 were used in Example 1 as an ethylene-based terpolymer and a long-chain branched low-density polyethylene produced by the high-pressure radical polymerization method, respectively. The evaluation results are shown in Table 2.

As apparent from Table 2, the laminates of the invention have a high heat-sealing strength and, despite this, have a low tear strength. Consequently, they are laminates having an excellent balance between heat-sealing strength and tearability.

On the other hand, the polyethylene-based films obtained using either an ethylene terpolymer having an Mp/Mh lower than 1.5 or an ethylene/1-hexene bipolymer have poor tearability (Comparative Examples 3, 4, and 5), while the polyethylene-based film obtained using no terpolymer has a poor balance between impact strength and tearability (Comparative Example 1). The polyethylene composition containing a low-density polyethylene having a low ME gives an unstable melt film (Comparative Example 6).

Example 7

A polyethylene composition composed of 60% by weight PE-1 as an ethylene-based terpolymer and 40% by weight long-chain branched low-density polyethylene having an MFR of 4 g/10 min, density of 0.918 g/cm$^3$, and ME of 2.4 (LDPE-1) was granulated with a 40-mm single-screw extruder. Thus, pellets of the polyethylene composition were obtained.

Using a 40-mmΦ single-screw extruder, the pellets obtained were extruded through a die having a width of 360 mm at a molding temperature of 320° C. so as to result in a film thickness of 20 μm onto 75-g/m$^2$ kraft paper. Thus, a laminate was obtained. The base was subjected to an in-line corona treatment. The results of evaluation of the laminate are shown in Table 3.

TABLE 2

| | Ingredient (A) | | Ingredient (B) | | Properties of laminate | | | | Processability |
|---|---|---|---|---|---|---|---|---|---|
| | | | | | Trouser-shaped tear strength | Elmendorf tear strength | Heat-sealing strength | | for laminate Melt film |
| | | Proportion | | Proportion | (TD) | (TD) | kgf | | stability |
| | Kind | wt % | Kind | wt % | N | N/mm | 120° C. | 140° C. | A |
| Example 1 | PE-1 | 80 | LDPE-1 | 20 | 1.7 | 1.9 | 3.0 | 2.9 | A |
| Example 2 | PE-1 | 60 | LDPE-2 | 40 | 0.2 | 1.3 | 2.8 | 2.9 | A |
| Example 3 | PE-1 | 40 | LDPE-2 | 60 | 0.3 | 0.2 | 2.6 | 2.7 | A |
| Example 4 | PE-2 | 40 | LDPE-2 | 60 | 3.3 | 0.9 | 2.6 | 2.7 | A |
| Example 5 | PE-5 | 80 | LDPE-2 | 20 | 0.2 | 0.8 | 2.9 | 3.0 | A |
| Example 6 | PE-6 | 40 | LDPE-2 | 60 | 0.4 | 1.6 | 2.9 | 3.0 | A |
| Comparative Example 1 | — | — | LDPE-2 | 100 | 0.1 | 0.2 | 1.9 | 2.1 | A |
| Comparative Example 2 | PE-1 | 100 | — | — | — | — | — | — | B |
| Comparative Example 3 | PE-3 | 80 | LDPE-1 | 20 | 16.5 | 8.7 | 2.6 | 2.8 | A |
| Comparative Example 4 | PE-4 | 80 | LDPE-1 | 20 | 18.0 | 7.8 | 3.0 | 3.0 | A |
| Comparative Example 5 | PE-4 | 60 | LDPE-2 | 40 | 10.1 | 4.6 | 3.0 | 3.0 | A |
| Comparative Example 6 | PE-1 | 80 | LDPE-3 | 20 | — | — | — | — | B |
| Comparative Example 7 | PE-7 | 80 | LDPE-2 | 20 | 9.9 | 4.9 | 3.0 | 3.0 | A |

Comparative Example 8

Molding and evaluation were conducted in the same manner as in Example 7, except that no ethylene-based terpolymer was used and LDPE-2 was used. The evaluation results are shown in Table 3.

Comparative Example 9

Molding and evaluation were conducted in the same manner as in Example 7, except that PE-4 (ethylene/1-hexene bipolymer) was used in Example 7 in place of the PE-1. The evaluation results are shown in Table 3.

TABLE 3

|  | Ingredient (A) | | Ingredient (B) | | Properties of laminate | | | Processability for laminate Melt film stability |
|---|---|---|---|---|---|---|---|---|
|  | | | | | Trouser-shaped tear strength-2 (TD) | Heat-sealing strength kgf | | |
|  | Kind | wt % | Kind | wt % | N | 120° C. | 140° C. | A |
| Example 7 | PE-1 | 60 | LDPE-1 | 40 | 3.2 | 0.9 | 1.0 | A |
| Comparative Example 8 | — | — | LDPE-2 | 100 | 2.4 | 0.5 | 0.8 | A |
| Comparative Example 9 | PE-4 | 60 | LDPE-1 | 40 | 4.4 | 1.0 | 1.1 | A |

As apparent from Table 3, the laminate of the invention has a high heat-sealing strength and, despite this, has a low tear strength. Consequently, it is a laminate having an excellent balance between heat-sealing strength and tearability.

On the other hand, the polyethylene-based film obtained using no terpolymer has a poor balance between impact strength and tearability (Comparative Example 8). The polyethylene-based film obtained using an ethylene/1-hexene copolymer has poor tearability (Comparative Example 9).

INDUSTRIAL APPLICABILITY

The laminate of the invention can be used as a film for easy-to-tear package bags, film for food packaging paper container for liquids, binding papers paper cups, paper trays, etc.

While the invention has been described in detail and with reference to specific embodiments thereof, it will be apparent to one skilled in the art that various changes and modifications can be made therein without departing from the spirit and scope thereof.

This application is based on a Japanese patent application filed on Aug. 17, 2004 (Application No. 2004-237365), the contents thereof being herein incorporated by reference.

The invention claimed is:

1. A laminate which comprises
a base layer and
a layer comprising: (A) 10-95% by weight of an ethylene-based terpolymer of ethylene, propylene, and either 1-hexene or 1-octene, which has the following properties (a-1) to (a-4); and (B) 5-90% by weight of a low-density polyethylene obtained by the high-pressure radical polymerization method, which has the following properties (b-1) to (b-3):
(a-1) a melt flow rate is 0.1-100 g/10 min;
(a-2) a density is 0.87-0.92 g/cm$^3$;
(a-3) an ethylene content is 80-99% by mole;
(a-4) a ratio of the molar proportion of propylene (Mp) to the molar proportion of 1-hexene or 1-octene (Mh), Mp/Mh, is 1.5 or higher;
(b-1) a melt flow rate is 0.1-20 g/10min;
(b-2) a density is 0.915-0.93 g/cm$^3$; and
(b-3) a memory effect is 1.6 or higher.

2. The laminate of claim 1, wherein the low-density polyethylene (B) is long-chain branched low-density polyethylene.

3. The laminate of claim 1 or 2, wherein the ethylene-based terpolymer (A) is produced with a metallocene catalyst.

4. The laminate of claim 1 or 2, wherein the ethylene-based terpolymer (A) further has the following property (a-5):
(a-5) a density (d) (g/cm$^3$) and a melting point (Tm) (° C.) satisfy expression (1):

$$1220 \times d - 1019 \leq Tm \leq 1220 \times d - 1005 \quad (1)$$

wherein the melting point (Tm) is a melting point as measured during second scanning with a DSC, and the melting point corresponds to the maximum peak height.

5. The laminate of claim 1 or 2, wherein the layer comprising the ethylene-based terpolymer (A) and the low-density polyethylene (B) is a layer formed by the extrusion coating method.

6. The laminate of claim 1 or 2, which is an easy-to-tear laminate.

7. The laminate of claim 1, wherein the base layer is a single-layer film made of at least one material selected from the group consisting of a nylon, polyester, polypropylene, polyethylene, and a ethylene/vinyl alcohol copolymer.

8. The laminate of claim 1, wherein the base layer is a multilayer film, each layer is made of at least one material selected from the group consisting of a nylon, polyester, polypropylene, polyethylene, and a ethylene/vinyl alcohol copolymer, and the each layer can be made form the same or different material.

9. The laminate of claim 1, wherein the base layer further comprises single-layer bases or multilayer bases made of at least one material selected from the group consisting of a paper, a foil of a metal, and plastic films coated with a metal or an inorganic or organic substance by vapor deposition.

10. The laminate of claim 9, wherein the content of the low density polyethylene is from 10 to 80 wt. %.

* * * * *